United States Patent [19]

Kageyama et al.

[11] 4,285,854
[45] Aug. 25, 1981

[54] ELASTOMER TIRE FILLING MATERIAL

[75] Inventors: Kunio Kageyama, Tokohama; Tetsuo Hayashi, Hiratsuka, both of Japan

[73] Assignee: The Yokohama Rubber Co., Ltd., Tokyo, Japan

[21] Appl. No.: 160,428

[22] Filed: Jun. 17, 1980

[30] Foreign Application Priority Data

Jun. 20, 1979 [JP] Japan ................................. 54-77711
Feb. 26, 1980 [JP] Japan ................................. 55-23238

[51] Int. Cl.³ ............................................. C08G 18/62
[52] U.S. Cl. ................................. 260/37 N; 528/59; 528/60; 528/61; 528/65; 528/66; 528/67; 528/75
[58] Field of Search ................. 260/37 N; 528/59, 60, 528/61, 65, 66, 67, 75

[56] References Cited

U.S. PATENT DOCUMENTS

| 2,511,544 | 6/1950 | Rinke et al. | 528/76 |
| 3,427,366 | 2/1969 | Verdol et al. | 528/75 |
| 3,607,976 | 9/1971 | Hsieh et al. | 528/75 |
| 3,629,172 | 12/1971 | Jones | 528/59 |
| 3,854,516 | 12/1974 | Barnell | 152/313 |
| 3,866,651 | 2/1975 | Gomberg | 525/440 |
| 3,866,652 | 2/1975 | Ahmad | 521/54 |
| 4,031,026 | 6/1977 | Ibbotson | 528/67 |

*Primary Examiner*—Maurice J. Welsh
*Attorney, Agent, or Firm*—Finnegan, Henderson, Farabow, Garrett & Dunner

[57] ABSTRACT

An elastomer obtained by reacting at a specific ratio an isocyanate-terminated prepolymer formed by reacting at a specific ratio of polymer containing a diene polymer having a terminal hydroxyl group with a diisocyanate compound, with a curing agent having a terminal hydroxyl or amine group, is especially excellent as a tire filling material. A tire prepared by filling this elastomer is valuable as an elastic tire of a public vehicle.

7 Claims, No Drawings

ELASTOMER TIRE FILLING MATERIAL

BACKGROUND OF THE INVENTION (1) Field of the Invention

The present invention relates to a void-free polyurethane elastomer for the flat-free pneumatic tire. More particularly, the invention relates to a urethane-urea type tire filling material having an excellent Lüpke rebound and an appropriate hardness.

(2) Description of the Prior Art

In many areas of severe service, "downtime" due to flat tires is a real problem. To maximize equipment operating efficiency and minimize "downtime" of pneumatic tire machines, a flat-free tire prepared by filling an elastomer is better than a pneumatic tire. Accordingly, use of a flat-free tire is desirable in such severe operational areas as aircraft support equipment, farm equipment, industrial vehicles such as forklift and tractors, lumbering operations, mining machinery and vehicles, military vehicles, scrap metal yard vehicles and computer controlled vehicles.

When a urethane type polymer is used as a filling material, a liquid prepolymer is injected in a cavity of a rimmed tire and the prepolymer is reacted in the tire casing to an appropriate hardness. Accordingly, processing of a tire by use of a urethane polymer as the tire filling material is advantageously very easy.

A urethane elastomer that has heretofore been used is prepared from a polyester or polyether having a terminal hydroxyl group (hereinafter referred to as "—OH group") and a diisocyanate, that is, polyurethane having a polyether or polyester as the skeleton. For example, "TYRFIL" (trademark of the product of Synair Co.) is said to be a reaction product of a mixture of polyoxypropylene glycol and polyoxypropylene triol with tolylene diisocyanate (hereinafter referred to as "TDI").

Such conventional urethane type elastomers have, however, the following defects.

(1) A tire filling material is required to have a high Lüpke rebound and an appropriate hardness. In conventional urethane type elastomers, if the Lüpke rebound is increased, the hardness becomes too great. On the other hand, if the hardness is reduced, the Lüpke rebound is also reduced.

(2) If the urethane elastomer repeatedly receives a stress under a load when used as a filling material in a tire, heat is produced and the urethane elastomer becomes incapable of resisting the stress, resulting in deterioration, melting, and loss of the predetermined elasticity and spring rate.

To moderate these defects, a method in which a layer of a halogenated butyl rubber is formed between the urethane elastomer and rubber has been proposed, based on the concept that deterioration of the urethane elastomer is due to transfer of an amine type antioxidant contained in the rubber of a tire to the urethane side. However, this solution is not entirely satisfactory.

There has also been proposed a method in which an isocyanurate ring ordinarily regarded as having a good heat resistance is formed simultaneously with formation and curing of a urethane elastomer. However, it is questionable whether an isocyanurate ring will be actually formed under mild conditions adopted for formation of a urethane elastomer, and even if an isocyanurate ring is actually formed, since the concentration of the isocyanurate ring is low, no substantial improvement of the heat resistance can be expected. Furthermore, if the amount formed of the isocyanurate ring is increased so as to improve the heat resistance, the hardness, Lüpke rebound and elasticity will depart from the desired ranges.

Three patents directed to urethane type elastomer filled tires in severe service are cited as prior art of interest, U.S. Pat. No. 3,866,651; U.S. Pat. No. 3,854,516 and U.S. Pat. No. 3,866,652.

SUMMARY OF THE INVENTION

It is therefore a primary object of the present invention to eliminate these defects involved in the conventional techniques and provide a tire filling material which has an excellent Lüpke rebound, an appropriate hardness and a good operation adaptability, which does not produce heat, and which when filled in a tire, also gives a comfortable ride to a vehicle.

More specifically, in accordance with the present invention, there is provided a tire filling material comprising an elastomer obtained by reacting (A) a prepolymer having a terminal isocyanate group with (B) a curing agent composed of a compound having a terminal hydroxyl or amino group at a ratio satisfying a requirement represented by the following formula (I):

$$0.7 \leq \frac{A}{B} \leq 1.3.$$

wherein A stands for the number of NCO groups in the prepolymer (A) and B stands for the number of OH or $NH_2$ group in the curing agent (B), said prepolymer (A) containing a product obtained by reacting (C) a polymer containing at least a diene polymer having a terminal hydroxyl group and a molecular weight lower than 10,000 with a diisocyanate compound at a ratio satisfying a requirement represented by the following formula (II):

$$1.6 \leq \frac{D}{C} \leq 3.0.$$

wherein D stands for the number of NCO groups in the diisocyanate compound and C stands for the number of OH groups in the polymer (C).

DETAILED DESCRIPTION OF THE INVENTION

The diene polymer that is used in the present invention has OH groups on both the terminal ends of the side chain, and it is a liquid or semi-solid polymer obtained by polymerizing a conjugated diene monomer having 4 to 5 carbon atoms. For introduction of OH groups, there may be adopted any of methods disclosed in Japanese Patent Publications Nos. 30103/75 and 30104/75, the method in which polymerization is carried out by using an organic metal catalyst such as an alkyl lithium as an initiator and ethylene oxide or the like as a terminator, the method in which an initiator having OH groups is used, and the method in which an ordinary diene polymer is oxidized and OH groups are added to the cut side chains.

In addition to the diene monomer, there may be used vinyl compounds such as styrene, acrylonitrile, acrylic acid and acrylic acid esters in amounts of up to 30 parts per 100 parts of the diene monomer.

This diene polymer that is used in the present invention should have hydroxyl terminal groups and the molecular weight of the diene polymer should be lower than 10,000. If the molecular weight is too high, when the diene polymer is reacted with a diisocyanate to form an isocyanate terminated prepolymer, the viscosity becomes too high and the filling operation becomes difficult.

The skeleton of the polymer (C) used in the present invention may consist solely of the diene polymer, but it is preferred that a polyoxyalkylene polymer be included in the polymer skeleton.

The polyoxyalkylene polyols used in the present invention are hydroxyl group terminated polyether of the type commonly used in poly(ether)urethane formation.

Polyoxyalkylene polyols to be prepared have 2–4 hydroxyl groups, wherein the alkylene has 2–6 carbon atoms, which may be obtained by condensation of the glycol having 2–6 carbon atoms such as ethylene glycol and 1,6-hexanediol The condensation may take place between an alkylene oxide such as ethylene oxide, propylene oxide, oxetane or tetrahydrofurane and a glycol such as ethylene glycol, propylene glycol, 1,4-butanediol, triol such as glycerin, trimethylol propane, an aminoalcohol such as monoethanolamine, diethanolamine, a quadrol such as pentaerythritol, ethylene diamine.

The molecular weight of the polyoxyalkylene polyol is 200 to 4,000 per active hydrogen atom and is lower than 10,000 as the whole.

If the polyoxyalkylene polyol is thus added to the diene polyol to form an isocyanate prepolymer, the viscosity of the prepolymer becomes lower than that of the prepolymer consisting solely of the diene polyol and the operation adaptability can be improved. Furthermore, since the polyoxyalkylene polyol is included in the prepolymer skeleton when a curing agent having polyether linkages in the skeleton is used, the compatibility is improved and a uniform cured product is obtained, and a stable tire filling material can be prepared.

As the diisocyanate compound that is used in the present invention, there can be mentioned, for example, hexamethylene diisocyanate, 2,4-tolylene diisocyanate, a mixture of 2,4- and 2,6-tolylene diisocyanates (2,4-isomer/2,6-isomer mixing ratio of from 80/20 or 65/35), xylylene diisocyanate, tolidine diisocyanate, phenylene diisocyanate (inclusive of m- and p-isomers), methylene-bis(2-methyl-p-phenylene) diisocyanate, 3,3'-dimethoxyl-4,4-biphenylene diisocyanate, 3,3-dimethyl-4,4-diphenylmethane diisocyanates, saturated cyclic diisocyanate compounds obtained by hydrogenating these aromatic diisocyanates, and isophorone diisocyanate. These diisocyanate compounds may be used singly or in the form of a mixture of two or more of them.

When the diene polyol is reacted with the diisocyanate it is necessary that the stoichiometrical ratio (NCO/OH) of the number of NCO groups in the diisocyanate to the number of OH groups in the diene polyol should be in the range of from 1.6 to 3.0.

Either when the diene polyol and the polyoxyalkylene polyol are reacted independently with the diisocyanate or when a mixture of the diene polyol and the polyoxyalkylene polyol is reacted with the diisocyanate, it is indispensable that the stoichiometric ratio (NCO/OH) of the number of NCO groups in the diisocyanate to the number of OH groups in the diene polyol and polyoxyalkylene polyol should be in the range of from 1.6 to 3.0.

If the NCO/OH ratio is lower than 1.6, the molecular weight of the resulting isocyanate-terminated prepolymer is too high and the viscosity is increased, with the result that filling into a tire becomes difficult.

If the NCO/OH ratio exceeds 3.0, the viscosity is reduced, but the reactivity of the NCO groups in the diisocyanate, that are not reacted with OH groups, is high and adjustment of the reaction becomes difficult. Furthermore, since the average molecular weight of the prepolymer is reduced, the density of urethane/urea linkages in the final polymer is increased, resulting in increase of the hardness. Accordingly, it is indispensable that the NCO/OH ratio should be in the range of from 1.6 to 3.0 in the stage of the prepolymer.

In the present invention, the isocyanate-terminated prepolymer prepared according to the above-mentioned method is cast into a tire together with a curing agent and curing is effected. A compound having a terminal OH group or a terminal amine group is used as the curing agent. The following compounds can be mentioned as examples of the curing agent.

More specifically, there can be mentioned OH group-terminated diene polymers mentioned above as the diene polyols to be used for formation of the prepolymer, products obtained by condensating preferably up to 10 moles of ethylene oxide or propylene oxide to these OH group-terminated diene polymers, polyols having a relatively low molecular weight, such as polyether polyol, 1,4-butane diol, trimethylol propane, 1,6-hexane diol, glycerin, castor oil and diethylene glycol, OH group-containing vegetable oils, amine-terminated polyalkylene oxides (for example, Jefferamin D-2000 manufactured by Jefferson Chem. Co.), and amine-terminated acrylonitrile-butadiene copolymers (for example ATBN 1300×16 manufactured by BF Goodrich Chem. Co.). These curing agents may be used singly or in the form of a mixture of two or more of them.

The reaction ratio of the prepolymer to the curing agent should be such that the NCO/OH or NH$_2$ ratio is in the range of from 0.7 to 1.3, preferably from 0.8 to 1.15. Since both the terminal ends of the prepolymer of the present invention are occupied by NCO groups, the amount of the NCO groups can be calculated by measuring the molecular weight of the prepolymer. If this NCO/OH or NH$_2$ ratio is lower than 0.7, the curing speed is low and the physical properties, especially the elongation, of the cured product are degraded. In contrast, if this ratio exceeds 1.3, the physical properties of the cured product are changed with the lapse of time and both the elongation and the tensile strength are degraded.

Since at least the diene polyol is included in the skeleton of the polyurethane of the present invention, the polyurethane of the present invention has a much higher Lüpke rebound than that of the conventional polyether or polyester type polyurethane and an appropriate hardness is maintained. It is considered that the reason will be that the hysteresis loss in the diene type polymer is smaller than in the polyether or polyester.

In preparing the isocyanate terminated prepolymer if a diisocyanate having a good symmetry is first reacted and an asymmetric diisocyanate such as tolylene diisocyane is then reacted, the reactivity can be controlled, and in this case, if a curing agent having a primary OH or NH$_2$ group having a high reactivity is used to complete the reaction, a tight cured product is obtained and the resulting tire filling material can sufficiently endure a high load or repeated fatigue.

It is preferred that the tire filling material of the present invention should have the following physical properties.

More specifically, the tire filling material should have a hardness of 15° to 45° as determined at 25° C. according to the method of JIS scale (Japanese Industrial Standard) and a Lüpke rebound of at least 50% at 25° C. and at least 70% at 100° C.

The hardness has a relation to the deflecting of the tire under load. For example, if the hardness is lower than 15°, the stress of the tire is very large, and heat is generated during running and the filling material tends to melt. If the hardness exceeds 45°, the cushioning effect is reduced and the ride comfortability of the vehicle is worse.

As the value of the Lüpke rebound is high, return to the stress becomes prompt, and heat build up by deformation or stress is reduced and good results are obtained. However, from the practical viewpoint, it is sufficient if the Lüpke rebound is at least 50% at 25° C. or at least 70% at 100° C.

In order to form the tire filling material of the present invention conveniently in a tire, it is preferred that the viscosity of the mixture of the prepolymer and curing agent to be cast into the tire be set at an appropriate level, that is, lower than 100 poises at a temperature of 10° to 50° C. If the viscosity is too high, casting of the filling material becomes difficult, and if the temperature is elevated to reduce the viscosity, the reaction speed is increased and no good results are obtained. For example, a time of 40 minutes to about 2 hours is necessary for casting into a tire of the 1000R-20 size, and a prepolymer having a relatively low viscosity should be used because the viscosity is increased during this period. Of course, the viscosity discussed is one just casting into a tire, and even if the viscosity of the polymer per se is high, the viscosity may be reduced by mixing the polymer with other polymer or a plasticizer described hereinafter. However, in the present invention, it is indispensable that the molecular weight of the diene polymer should be lower than 10,000.

A plasticizer having a good compatibility with the final polymer should be selected and used. For example, an aliphatic dicarboxylic acid ester, a glycol ester of a monocarboxylic acid, a process oil for rubber, pine tar, polybutene and an inactive liquid polymer are preferably used. However, if the plasticizer is used in a large quantity, the Lüpke rebound is reduced. Accordingly, the pasticizer should be used in an amount of up to 100 parts, preferably up to 50 parts, per 100 parts of the polymer.

In order to cure the above-mentioned mixture promptly, catalyst such as a tertiary amine, e.g., triethylene diamine or triethylene tetramine, an amino alcohol, 1,8-diazabicyclo(5,4,0)-undecene-7 or its salt, an imidazole, an organic Sn compound or an organic Fe compound can be used. It is preferred that the amount of the catalyst be up to 0.1 part per 100 parts of the prepolymer.

Furthermore, graphite, carbon black, clay, talc or silica may be added as the additive filler. However, if such filler is incorporated in too large an amount, the hardness is increased or the Lüpke rebound is reduced. Accordingly, it is preferred that the filler be incorporated in an amount of up to 10 parts per 100 parts of the polymer. It is considered that the effect of such filler is to prevent local generation of the heat. For example, in case of graphite, if the particle size exceeds 150$\mu$, a heterogeneous substance effect is manifested and the dynamic fatigue resistance is drastically reduced. Accordingly, the particle size should be smaller than 150$\mu$.

The present invention will now be described in detail with reference to the following Examples.

EXAMPLE 1

In a reaction vessel equipped with a stirrer and filled with an inert gas (dry $N_2$), 14.7 parts of a mixture of 2,4- and 2,6-tolylene diisocyanates of a mixing ratio of 80/20 (hereinafter referred to as "TDI") was added to 100 parts of an OH group-terminated liquid polybutadiene (having a chemical structure of 60% of 1,4-trans, 20% of 1,4-cis and 20% of 1,2-vinyl and a number average molecular weight of 2700 to 3000; R45-HT manufactured by Arco Chemical Co.), and reaction was carried out at 60° C. for 8 hours. In this reaction, the NCO/OH ratio was about 2.36. A prepolymer having terminal NCO groups was obtained by this reaction. Then, 100 parts of the so-obtained prepolymer was mixed with 100 parts of a mixture comprising 111 parts of the above-mentioned R45-HT as a curing agent, 20 parts of dioctyl phthalate as a plasticizer and 0.046 parts of lead octate as a catalyst. The mixture was mechanically blended sufficiently and filled into a tire of the 1000R20 size by means of a pump. The NCO/OH ratio of the NCO groups in the prepolymer to the OH groups in the curing agent was 1.13.

A urethane elastomer was prepared in the same manner as described above and cast in a mold for preparing a sample for the measurement of the Lüpke rebound, and the elastomer was cured under the same conditions as curing conditions for tires. The hardness and Lüpke rebound of the cured product were determined to obtain results shown in Table 1.

COMPARATIVE EXAMPLE 1

100 parts of polyoxypropylene triol ($\overline{Mw}=1000$) was reacted with 60 parts of 2,4-/2,6-TDI having a mixing ratio of 80/20 (NCO/OH=2.3) to obtain an NCO-terminated prepolymer having a molecular weight of 1510. Then, 100 parts of this prepolymer was mixed with 230 parts of polyoxypropylene glycol ($\overline{Mw}=2000$) (NCO/OH=1.0), and the mixture was filled into a tire in the same manner as described in Example 1.

Both the tires obtained in Example 1 and Comparative Example 1 were pressed to a drum having a smooth surface and a diameter of 1.6 m under a load of 3000 Kg, and the durability test was conducted under running conditions of an ambient temperature of 35° C. and a speed of 60 Km/hr. The obtained results are shown in Table 1.

TABLE 1

|  | Example 1 | Comparative Example 1 |
|---|---|---|
| Hardness (degrees) | 30 | 30 |
| Lupke rebound (%) |  |  |
| 25° C. | 60 | 51 |
| 100° C. | 90 | 68 |
| Running Distance (Km) | above 10000 | 2200* |

Note
*running became impossible because of melting

From the results shown in Table 1, it is seen that the filler of the present invention is excellent in the Lüpke rebound and therefore, the running distance of the tire containing the filling mateiral of the present invention is longer than that of the tire containing the comparative filling mateiral, though the hardness was the same in both the filling materials.

COMPARATIVE EXAMPLE 2

121 parts of polyoxyethylene propylene glycol ($\overline{Mw}=1000$) was incorporated as the curing agent into the same prepolymer as used in Example 1 (NCO/OH=0.95). The obtained filling material was characterized by a hardness of 48° and a Lüpke rebound of 60% at 25° C. or 85% at 100° C. When a tire containing the filling material was subjected to durability test, cracks were formed in the filling material and running became impossible after running of 2000 km.

EXAMPLE 2

In a reaction vessel equipped with a stirrer and filled with an inert gas (dry $N_2$), 20 parts of 4,4'-diphenylmethane diisocyanate (hereinafter referred to as "MDI") was added to a mixture of 80 parts of an OH group-terminated liquid polybutadiene (having a chemical structure of 60% of 1,4-trans, 20% of 1,4-cis and 20% of 1,2-vinyl and a number average molecular weight of 2800) (R45HT manufactured by ARCO Chemical Co.) and 20 parts of polypropylene glycol (having a molecular weight of about 2000), and reaction was carried out at 60° C. for 1 hour.

Then, 5 parts of a 2,4-/2,6-tolylene diisocyanate mixture (mixing ratio=80/20) (hereinafter referred to as "TDI") was added to the above reaction product, and reaction was further conducted for 2 hours.

In the above reaction, the NCO/OH ratio was about 2.55.

A prepolymer having NCO groups at both the terminal ends was obtained by the above reaction, and the concentration of the NCO groups was 4.33%.

To 100 parts of the prepolymer, 100 parts of polyoxypropylene triol having 10% by weight of ethylene oxide condensated to the terminals thereof (molecular weight=about 3000, OH value=55.4) was added as the curing agent to effect reaction between them.

In this case, so as to obtain a higher mixing efficiency and also to make the nature of the mixture suitably adapted to the specification of an injection device which was commercially obtained for use in the present invention, it was operated to incorporate a plasticizer comprising dioctyl phthalate to the prepolymer and the curing agent, in a manner to obtain a mixing ratio in volume of 1:1 of the latter two members, and agitate them altogether, followed by charging the resulting mixture by pumping into a tire of the size, 1300R-20.

The NCO/OH ratio of the NCO groups in the prepolymer to the OH groups in the curing agent was 1.03.

After the filling material had been cured, the obtained tire was pressed to a drum having a smooth surface and a diameter of 1.6 m under a load of 3000 Kg, and the durability test was carried out under running conditions of an ambient temperature of 35° C. and a speed of 60 Km/hr to obtain results shown in Table 2.

The filling material was not cast into the tire but cured separately, and the hardness and Lüpke rebound were measured to obtain results shown in Table 2.

TABLE 2

|  | Example 2 |
| --- | --- |
| Hardness, JIS (Scale) | 30 |
| Lupke rebound | |
| 25° C. | 58 |
| 100° C. | 89 |

TABLE 2-continued

|  | Example 2 |
| --- | --- |
| Driving Distance (Km) | above 10000 |

EXAMPLE 3

To 100 parts of an OH group-terminated liquid polyisoprene (having a chemical structure of 60% of 1,4-trans, 20% of 1,4-cis and 10% each of 1,2- and 3,4-linkages, a number average molecular weight of 3000 and an OH group content of 0.075 meq/g), 18.8 parts of diphenylmethane diisocyanate (MDI) was added, and reaction was carried out at 60° C. for 1 hour. Then, 4.4 parts of tolylene diisocyanate (TDI) was added and reaction was conducted for 2 hours. The NCO/OH ratio was 2.70 in this reaction.

A prepolymer having NCO groups at both the terminal ends was obtained by the above reaction. The concentration of the NCO groups was 4.26%. This prepolymer is designated as "prepolymer X".

Separately, 100 parts of polyoxypropylene glycol (having a number average molecular weight of 2000 and an OH group content of 0.1 meq/g) was reacted with 17.5 parts of TDI at 70° C. for 3 hours to obtain a prepolymer having an NCO group concentration of 3.5%. This prepolymer is designated "prepolymer Y".

Then, 80 parts of the prepolymer X was mixed with 20 parts of the prepolymer Y and 10 parts of ethylene glycol dibenzoate as a plasticizer for improving the compatibility and the processability, and the mixture was sufficiently blended.

Separately, a curing agent was prepared by mixing polyoxypropylene triol having 10% by weight condensated to the terminal ends thereof (having a molecular weight of about 3000 and an OH group content of 0.10 meq/g) with 17 parts of the above-mentioned plasticizer.

Then, the above-mentioned prepolymer was mixed with the curing agent at a mixing volume ratio of about 1:1, and by using an ordinary commercial pump, the mixture was filled into a tire of the 1300R-20 size while the mixture was stirred. The NCO/OH ratio of the NCO groups in the prepolymer to the OH groups in the curing agent was 1.10.

The filling material was allowed to stand still at room temperature to effect curing, and the obtained tire was pressed to a smooth drum having a diameter of 1.6 m under a load of 3000 Kg and was subjected to the durability test under conditions of an ambient temperature of 35° C. and a speed of 60 Km/hr. The running distance was about 10000 Km and an injury was observed. When curing was effected simultaneously with casting, the Lüpke rebound was 56% at 25° C. or 87% at 100° C. It was found that even if the prepolymers were separately prepared and they were then blended, the objects of the present invention could be sufficiently attained.

EXAMPLE 4

In the same manner as described in Example 2, R45HT was reacted with TDI so that the NCO/OH ratio shown in Table 3 was attained, and the so formed NCO-terminated prepolymer mixed and reacted with R45HT so that the NCO/OH ratio was 1.0 to obtain a filled tire and a sample for measurement of the Lüpke rebound. The obtained results are shown in Table 3.

TABLE 3

| Run No. | NCO/OH Ratio at preparation of prepolymer | Hardness (degrees) | Lupke rebound (%) 25° C. | Lupke rebound (%) 100° C. | Running distance (Km) | Remarks |
|---|---|---|---|---|---|---|
| 1 | 1.5 | 15 | 40 | 60 | — | casting impossible, viscosity too high |
| 2 | 1.6 | 18 | 50 | 70 | 8000 | |
| 3 | 2.0 | 35 | 60 | 88 | >10000 | |
| 4 | 3.0 | 40 | 63 | 82 | >10000 | |
| 5 | 3.2 | 47 | 50 | 69 | 200 | insufficient deflection, hardness too high |

From the results shown in Table 3, it is seen that the NCO/OH ratio at the step of preparation of the prepolymer has influences on the characteristics of the elastomer, especially Lüpke rebound, and that this ratio should be maintained in the range of $1.6 \leq NCO/OH \leq 3.0$.

EXAMPLE 5

The same prepolymer as obtained in Example 2 was used and R45HT was added as the curing agent so that the NCO/OH was adjusted to a level shown in Table 4. The properties were determined to obtain results shown in Table 4.

TABLE 4

| Run No. | NCO/OH Ratio of preparation of elastomer | Hardness (JIS scale) | Lupke rebound (%) 25° C. | Lupke rebound (%) 100° C. | Running distance (Km) | Remarks |
|---|---|---|---|---|---|---|
| 6 | 0.6 | 10 | — | — | — | measurement impossible |
| 7 | 0.7 | 30 | 55 | 72 | 6400 | |
| 8 | 1.0 | 35 | 60 | 88 | >10000 | |
| 9 | 1.3 | 38 | 63 | 86 | 8000 | |
| 10 | 1.4 | 35 | 57 | 65 | 200 | |

From the results shown in Table 4, it will readily be understood that when the value of the Lüpke rebound is high, the quantity of heat build up under repeated application of the stress is small, and that if a filling material having a high Lüpke rebound is filled in a tire, the running distance can be prolonged.

EXAMPLE 6

To 100 parts by weight of the same filling material as used in Run No. 7 of Example 5 was added 5 parts by weight of graphite having a particle size distribution range of from 10 to 20μ, and the predetermined tests were carried out. It was found that the hardness (JIS scale) was 31°, the Lüpke rebound was 54% at 25° C. or 71% at 100° C. and the running distance was above 10000 Km. It is considered that the fact that although the Lüpke rebound was reduced by incorporation of graphite, the running distance of the tire exceeded 10000 Km means that local heat build up was inhibited by incorporation of graphite.

EXAMPLE 7

Properties of filling material prepared by using various combinations of polymers including diene polymers are shown in Table 5. Incidentally, polyurethane urea elastomers were cured in the same manner as described in Example 2.

TABLE 5

| | Run No. 11 | 12 | 13 | 14 | 15 | 16 | 17 | 18 | 19 |
|---|---|---|---|---|---|---|---|---|---|
| Prepolymer[4] | | | | | | | | | |
| P | 100 | 100 | 100 | 100 | 100 | 100 | 100 | | 50 |
| Q | | | | | | | | 100 | 50 |
| Curing Agent[4] | | | | | | | | | |
| polyoxypropylene glycol 2000[1] | 88 | | | | 45 | | | | |
| ATBN[2] 8500[1] | | | | | | 148 | | | |
| OH-terminated polybutadiene 2700[1] | | 111 | | 46 | 50 | | 13 | 150 | 180 |
| diene-ether polyol[3] 2800[1] | | | 116 | | | | | | |
| ethylene glycol 62[1] | | | | 1.5 | | | | | |
| 1,4-butanediol 90[1] | | | | | | | 8 | | |
| OH-terminated polyisoprene 10000[1] | | | | | | | 30 | | |
| NCO/OH or NH₂ Ratio at Preparation of Elastomer | 0.94 | 0.95 | 0.94 | 0.95 | 0.95 | 0.96 | 0.95 | 1.02 | 0.99 |
| Catalyst[4] | | | | | | | | | |
| lead octate | 0.04 | | 0.04 | 0.04 | 0.04 | | 0.04 | 0.04 | 0.04 |
| triethylene diamine | | 0.04 | | | | | | | |
| Plasticizer[4] | | | | | | | | | |
| dioctyl phthalate | 27 | 20 | 20 | 30 | 20 | 50 | | 50 | 40 |
| Physical Properties | | | | | | | | | |
| Lupke rebound (%) | | | | | | | | | |
| 25° C. | 60 | 60 | 62 | 63 | 65 | 65 | 58 | 61 | 55 |

TABLE 5-continued

| | Run No. | | | | | | | | |
|---|---|---|---|---|---|---|---|---|---|
| | 11 | 12 | 13 | 14 | 15 | 16 | 17 | 18 | 19 |
| 100° C. | 82 | 90 | 85 | 88 | 92 | 85 | 80 | 80 | 78 |

Note
[1] Molecular weight
[2] Amine-terminated butadiene-acrylonitrile copolymer
[3] OH-terminated polymer having a molecular weight $\overline{Mw}$ of 2800, which was obtained by condensating ethylene glycol to OH-terminated polyfunctional polybutadiene
[4] Each number indicates the amount (parts by weight)

In Table 5, the prepolymer P is the same prepolymer as used in Example 2, and the prepolymer Q is a prepolymer having a isocyanate content of 6%, which was obtained by condensating ethylene oxide to both the terminal ends of a liquid polybutadiene having a molecular weight $\overline{Mw}$ of 2800 to form a diene-ether type polyol and reacting this diene-ether type polyol with 2,4-TDI.

At the durability test, any of tires prepared by using the filling material shown in Table 5 was not changed at all after driving of more than 10000 Km.

EXAMPLE 8

Properties of filling materials prepared by using various polymer combinations of diene polyols and polyoxyalkylene polyols are shown in Table 7.

The methods adopted for hardening polyurethane elastomers and preparing prepolymers were the same as those described in Example 2, though the amounts of the liquid polybutadiene and polyoxypropylene glycol were changed.

Components and compositions used in preparing prepolymers as shown in Table 6. It was found that it is preferred that the polyoxyalkylene polyol be used in an amount of 5 parts per 100 parts of the polyol having the diene structure.

In Table 7, the prepolymer R is the same as the prepolymer obtained at run No. 21 shown in Table 6 and the prepolymer S is a prepolymer having an isocyanate content of 6.2%, which was obtained by adding ethylene oxide to both the terminals of a liquid polybutadiene having a number average molecular weight of 2800, blending 20 parts of polyoxypropylene glycol (molecular weight=2000) into 100 parts of the so obtained diene-ether type polyol and reacting the mixture with 2,4-TDI.

Any of tires prepared by using filling materials shown in Table 7 was not changed at the durability test after running of more than 10000 Km.

TABLE 6

| | Run No. | | | | | | | | | | |
|---|---|---|---|---|---|---|---|---|---|---|---|
| | 20 | 21 | 22 | 23 | 24 | 25 | 26 | 27 | 28 | 29 | 30 |
| Liquid polybutadiene (R45HT) | 100 | 100 | 100 | 100 | 100 | 100 | 100 | 100 | 100 | 100 | 100 |
| polyoxypropylene diol having molecular weight of 1000 | 5 | 10 | 20 | | | | | | | | |
| polyoxypropylene diol having molecular weight of 4000 | | | | | 30 | 50 | | | | | |
| polyoxypropylene triol having molecular weight of 4000 | | | | | | | 80 | 100 | | | |
| 1,6-hexane diol | | | | | | | | | | 3 | 5 |
| 1,6-hexane diol polytetramethylene ether glycol having molecular weight of 800 | | | | | | | | | | | 40 |
| MDI | 8 | 14 | 20 | | | | 20 | 25 | 25 | | 25 |
| 2,4-/2,6-TDI | 14 | 12 | 15 | 21 | 25 | 27 | 20 | | | 40 | |
| hexamethylene diisocyanate | | | | | | | | 20 | 15 | | 15 |
| NCO content (%) | 7.6 | 4.5 | 5.6 | 6.6 | 5.2 | 4.7 | 4.7 | 4.4 | 7.1 | 8.2 | 4.8 |
| NCO/OH ratio | 2.4 | 2.4 | 2.7 | 2.9 | 2.9 | 2.9 | 2.7 | 2.5 | 2.8 | 2.6 | 2.0 |
| viscosity (cps at 30° C.) | 11000 | 12500 | 13000 | 14000 | 9800 | 8700 | 7000 | 6300 | 13000 | 14000 | 12000 |

TABLE 7

| | Run No. | | | | | | | | | |
|---|---|---|---|---|---|---|---|---|---|---|
| | 31 | 32 | 33 | 34 | 35 | 36 | 37 | 38 | 39 | 40 |
| Prepolymer | | | | | | | | | | |
| R | 100 | 100 | 100 | 100 | 100 | 100 | | | 50 | 80 |
| S | | | | | | | 100 | 100 | 50 | 20 |
| Curing Agent | | | | | | | | | | |
| polyoxypropylene glycol 1000[1] | 60 | | | | 40 | | 66 | | 65 | 6 |
| ATBN[2] | | 260 | | | | | | | | |
| OH-terminated polybutadiene[3] | | | 145 | | | | | 100 | | |
| diene-ether polyol[4] | | | | 180 | | | | | | |
| N,N-bis(2-hydroxypropyl)[1]aniline | | | | | 5 | | | 3 | | |
| OH-terminated polyisoprene[5] | | | | | | 150 | | | | |
| NCO/OH or NCO/NH$_2$ Ratio at | 1.10 | 1.0 | 1.10 | 1.05 | 1.04 | 1.18 | 1.00 | 1.19 | 1.02 | 1.05 |

TABLE 7-continued

| | Run No. | | | | | | | | | |
|---|---|---|---|---|---|---|---|---|---|---|
| | 31 | 32 | 33 | 34 | 35 | 36 | 37 | 38 | 39 | 40 |
| preparation of elastomer | | | | | | | | | | |
| Catalyst | | | | | | | | | | |
| trisaminomethyl phenol | | | | | | 0.02 | | | 0.02 | |
| triethylene diamine | | | 0.01 | | | | 0.02 | | | |
| Plasticizer | | | | | | | | | | |
| 2-ethylhexyl phthalate | 30 | | | 60 | 20 | | | | | 35 |
| chlorinated paraffin | | 60 | | | | | 34 | | | |
| ethylene glycol benzoate | | | 45 | | | 60 | | | | |
| Properties | | | | | | | | | | |
| Lupke rebound (%) | | | | | | | | | | |
| 25° C. | 60 | 55 | 63 | 58 | 64 | 58 | 57 | 61 | 59 | 61 |
| 100° C. | 83 | 78 | 85 | 80 | 86 | 79 | 77 | 84 | 81 | 70 |
| hardness, JIS (scale) | 35 | 36 | 38 | 33 | 40 | 35 | 32 | 39 | 41 | 32 |

Notes
[1]Polyoxypropylene glycol having a molecular weight of 1000
[2]Amine group-terminated butadiene-acrylonitrile copolymer, ATBN 1300X16 manufactured by BFGoodrich Co.
[3]R-45HT
[4]Polymer having an OH group content of 0.070 meq/g, which was obtained by condensating ethylene oxide to R-45HF
[5]liquid polyisoprene having an OH group content of 0.075 an OH group content of 0.075 meq/q and a number average molecular weight of about 3000, which was prepared according to the teachings of Japanese Patent Publication No. 30103/75

What is claimed is:

1. A tire filling material comprising an elastomer obtained by reacting (A) a prepolymer having a terminal isocyanate group with (B) a curing agent composed of a compound having a terminal hydroxyl or amino group at a ratio satisfying a requirement represented by the following formula (I):

$$0.7 \leq \frac{A}{B} \leq 1.3 \qquad (I)$$

wherein A stands for the number of NCO groups in the prepolymer (A) and B stands for the number of OH or $NH_2$ groups in the curing agent (B), said prepolymer (A) containing a product obtained by reacting (C) a polymer containing at least a diene polymer having a terminal hydroxyl group and a molecular weight lower than 10,000 with a diisocyanate compound at a ratio satisfying a requirement represented by the following formula (II):

$$1.6 \leq \frac{D}{C} \leq 3.0 \qquad (II)$$

wherein D stands for the number of NCO groups in the diisocyanate compound and C stands for the number of OH groups in the polymer (C).

2. A tire filling material as set forth in claim 1 wherein the polymer (C) contains a polyoxyalkylene polymer having a terminal hydroxyl group and a molecular weight lower than 10000.

3. A tire filling material as set forth in claim 1 wherein the prepolymer (A) contains a product obtained by reacting (C) a polymer containing at least a polyoxyalkylene polyol having a terminal hydroxyl group and a molecular weight lower than 10000 with a diisocyanate compound at a ratio satisfying a requirement represented by the following formula (II):

$$1.6 \leq \frac{D}{C} \leq 3.0 \qquad (II)$$

wherein D stands for the number of NCO groups in the diisocyanate compound and C stands for the number of OH groups in the polymer (C).

4. A tire filling material as set forth in claim 1 wherein the elastomer has a hardness (JIS scale) of 15° to 45° as determined at 25° C. and a Lüpke rebound of at least 50% as measured at 25° C. and at least 70% as measured at 100° C.

5. A tire filling material as set forth in claim 1 wherein the curing agent (B) is the same compound as the polymer (C).

6. A tire filling material as set forth in claim 2 or 3 wherein the diisocyanate compound comprises a diisocyanate having a symmetric structure and a diisocyanate having an asymmetric structure.

7. A tire filling material as set forth in claim 1 wherein the elastomer contains a filler additive selected from the group consisting of graphite, carbon black, clay, talc and silica.

* * * * *